Feb. 15, 1944. A. DE L. SINDEN Re. 22,437

CONVEYING APPARATUS

Original Filed Aug. 12, 1939 2 Sheets-Sheet 1

Inventor:
Alfred Delos Sinden
by J. Stanley Churchill
Att'y.

Feb. 15, 1944. A. DE L. SINDEN Re. 22,437

CONVEYING APPARATUS

Original Filed Aug. 12, 1939 2 Sheets-Sheet 2

Inventor:
Alfred Delos Sinden
by J. Stanley Churchill
Atty.

Reissued Feb. 15, 1944

Re. 22,437

UNITED STATES PATENT OFFICE 22,437

CONVEYING APPARATUS

Alfred Delos Sinden, Aurora, Ill., assignor to Redler Conveyor Company, Quincy, Mass., a corporation of Massachusetts Original No. 2,280,166, dated April 21, 1942, Serial No. 289,902, August 12, 1939. Application for reissue October 27, 1942, Serial No. 463,516

13 Claims. (Cl. 221—130)

This invention relates to conveying apparatus for conveying flowable solid material.

In general, the invention has for one of its objects to provide a novel and improved conveying apparatus which is particularly useful in effecting the discharge of non-free flowing solid materials from a bin or other chamber containing a bulk supply thereof in a manner such as to insure uniformity and continuity in the flow of the material to a second conveyer or other instrumentality.

A further and more specific object of the invention is to provide a novel and improved conveying apparatus of the type illustrated in and forming the subject matter of the United States patent to Fasmer No. 2,146,061, issued February 7, 1939, and by which the above-mentioned non-free flowing solid materials or those solid materials which have a tendency to bridge may be successfully handled.

With these general objects in view and such others as may hereinafter appear, the invention consists in the conveying apparatus and in the various structures, arrangements and combinations of parts hereinafter described and particularly defined in the claims at the end of this specification.

Figure 1:
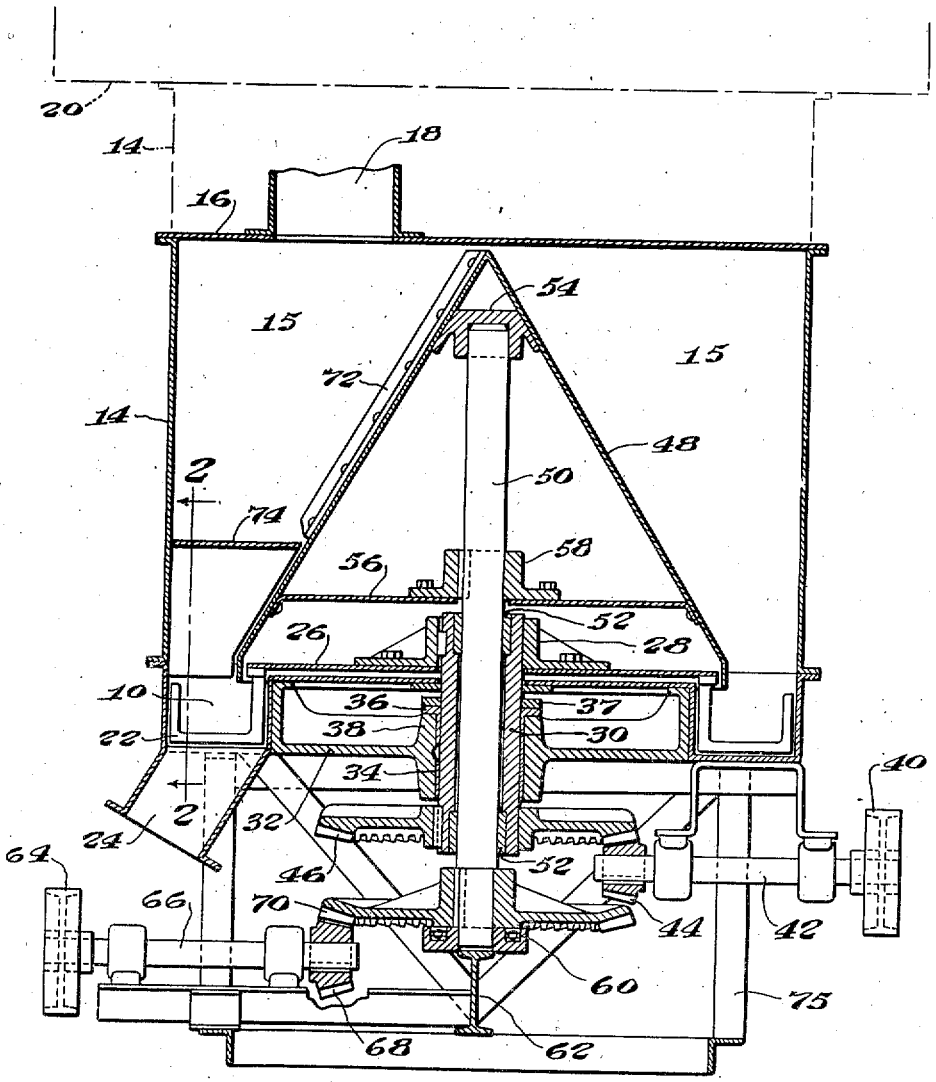
Figure 2:
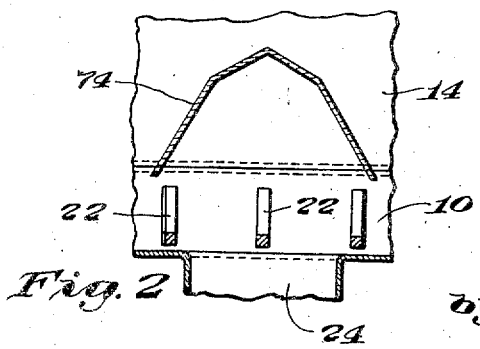
Figure 3:
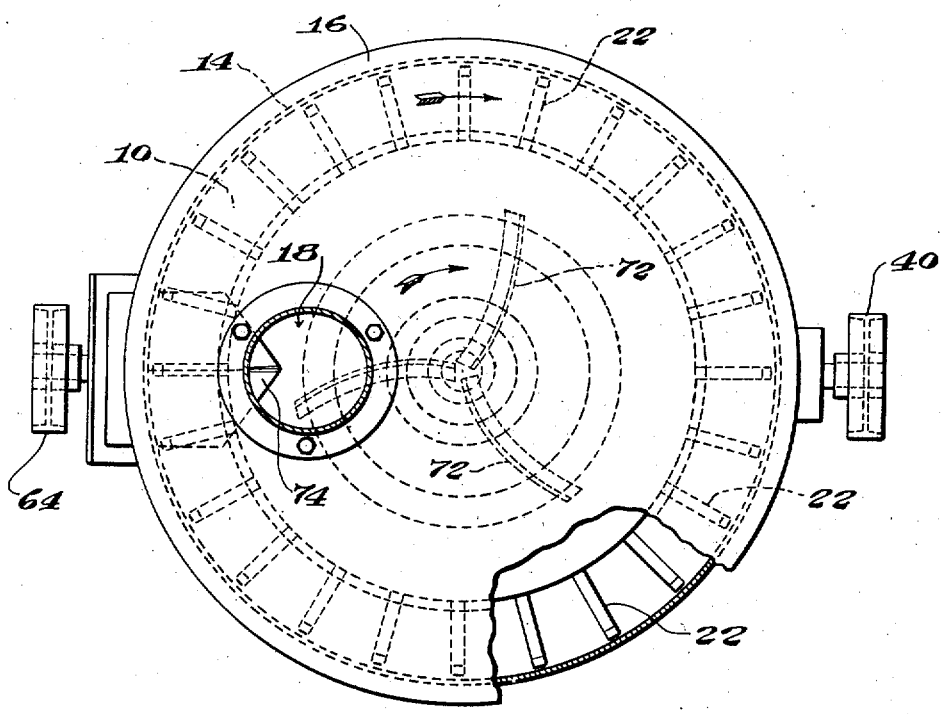

In the drawings illustrating the preferred embodiment of the invention, Fig. 1 is a vertical sectional view of the present conveying apparatus; Fig. 2 is a sectional detail taken on the line 2—2 of Fig. 1; and Fig. 3 is a plan with portions broken away of the conveying apparatus shown in Fig. 1.

For many industrial purposes it is desirable to convey various finely divided solid materials from a bulk supply thereof and to deliver a stream of the materials in a substantially uniform manner to another instrumentality such as another conveyer or another machine. In the United States patent to Fasmer, No. 2,146,061, a conveying apparatus of the circular type is disclosed by which material is fed by an open flight type of conveyer through a circular trough from an inlet to an outlet, and when the discharge is closed the open flight type of conveyer enables a recirculation of the material to be effected through the trough and the apparatus to be continuously operated. The material discharged from the conveying apparatus flows in a substantially uniform stream and apparatus of this character finds many industrial uses to feed various finely divided solid materials to other machines and other conveyers and the like.

In general the present conveying apparatus embodies a trough, preferably circular in shape and having a series of spaced open flights disposed therein and arranged to be drawn therethrough. In its preferred form the apparatus contemplates a circular trough and the provision of a rotatable member to which the flights are rigidly secured to rotate therewith, and provision is made for rotating the member to effect the conveyance of flowable solid material introduced into the trough preferably by gravity from a supply reservoir disposed immediately above the trough. In order to enable the apparatus to most successfully handle materials of the type commonly referred to as non-freely flowing materials and those materials which have a tendency to bridge, the supply reservoir may and preferably will be provided with an agitating device comprising preferably a conical member arranged to be rotated preferably independently of and at a much slower rate than the conveying flights. The conical member is preferably arranged to cooperate with the walls of the supply reservoir to deflect and guide the material within the reservoir as it falls by gravity into the trough, and in some instances the conical member may and preferably will be provided with vanes arranged to assist in the downward movement of the material into the trough. The cooperative action of the slowly rotating conical member and the stationary walls of the reservoir serve to overcome any tendency of the material to bridge over the mouth of the trough and to thereby insure continuous supply of the material into the trough.

Although in the preferred form of the invention, as illustrated herein, the conical member is shown as being rotatable, it will be obvious that the same effect may be produced by any relative rotation between the walls of the supply reservoir and the conical member.

Referring now to the drawings, 10 represents a circular trough or casing which may and preferably will be provided with an extended cylindrical side wall 14 forming a reservoir 15 for the material above the trough and in direct communication therewith. As herein shown, the reservoir may be provided with a cover 16 having an inlet 18 through which material may be delivered from the source of supply. In some instances, as illustrated by dotted lines in Fig. 1, the side walls 14 may be extended to communicate directly with a storage bin 20 or other source of supply.

As herein shown, the circular trough 10 is provided with a conveying element comprising a plurality of U-shaped open flights 22 rotatable through the casing to effect the conveyance of the material in a substantially uniform stream to be discharged through an outlet 24 provided in the bottom of the casing 10. The discharge outlet may be connected to a second machine such as a conveyer, not shown, for example to the supply hopper of a weighing machine, such uses being merely illustrative of one of the many industrial uses to which the present conveyer may be put.

In the illustrated embodiment of the invention, provision is made for rotating the conveying element through the circular casing 10 and, the open flight members 22 are welded or otherwise secured to the periphery of a rotary disk 26. The rotary disk 26 is attached to a flanged hub 28 keyed to a vertical sleeve 30. The trough 10 is mounted upon a supporting bracket 32 having a centrally disposed hub 38 in which the sleeve 30 is rotatably mounted. The hub 38 is provided with a bushing 34 having a flanged portion 36 against which a collar 37 fast on the sleeve 30 is arranged to bear in order to support the sleeve and the conveying element in its vertically disposed position with relation to the trough 10. As illustrated in Fig. 1, the flights 22 are arranged to sweep the bottom and side walls of the trough to convey the material in a continuous stream therethrough. Provision is made for rotating the sleeve 30 from any convenient source of power through connections including a driven pulley 40 fast on a horizontal shaft 42, a bevel pinion 44, and a bevel gear 46, the latter being keyed to the lower end of the sleeve 30.

In accordance with the present invention, provision is made for preventing arching of the material over the mouth of the trough to thereby insure a continuous supply thereto to the end that the conveyer may deliver a constant and substantially uniform stream of material. For this purpose, a conical member 48 is provided within the reservoir 15 and is preferably arranged to be rotated with respect to the cylindrical side wall 14 of the reservoir. The conical member 48 is supported upon a vertical shaft 50 mounted to rotate in suitable bearings 52 provided in the centrally disposed sleeve 30 and the upper end of the conical member is secured to a flanged member 54 attached to the upper end of the vertical shaft 50 and the lower end of the conical member is provided with a reenforcing disk 56 secured to a flanged member 58, the latter being keyed to the vertical shaft 50. The lower end of the shaft 50 is supported by a thrust bearing 60 mounted upon an I-beam 62 forming part of the supporting structure for the conveyer.

Provision is made for rotating the conical member from any convenient source of power through connections including a driven pulley 64 fast on a horizontal shaft 66, and a bevel pinion 68 which meshes with a bevel gear 70 fast on a shouldered portion of the vertical shaft and, as illustrated, the end of the hub of the bevel gear 70 forms a bearing surface against the thrust bearing 60 to support the weight of the shaft and the conical member in its vertical position.

From the description thus far, it will be observed that any tendency of the material to bridge across the mouth of the trough will be overcome by the relative rotation of the conical member 48 within the reservoir and the cylindrical wall 14 thereof. In practice, the conical member may be rotated in either direction, and as herein shown, may preferably be rotated in the same direction as the conveying element and preferably at a relatively slow speed.

As above stated, the rotary conical member 48 may be provided with vanes 72 secured to the outer surface thereof in order to assist in loosening the material and to permit it to fall freely by gravity into the trough 10. The vanes may start at the apex of the cone and will preferably be slanted backwardly from the direction of travel of the cone as clearly shown in Fig. 3.

Provision is made in the illustrated embodiment of the invention for preventing the material in the reservoir 15 from falling directly through the discharge opening 24 to the end that a uniform volumetric discharge may be maintained. As herein shown, see Fig. 2, a plate or hood 74 may be provided within the reservoir above the trough 10 at the point of discharge 24. Thus, the pressure of the head of material above the discharge outlet is taken by the plate thereby preventing packing of the material in the discharge outlet.

From the above description it will be observed that the present feeding apparatus is simple in construction and positive in operation, and is particularly useful in those commercial installations where it is desirable to effect and control the withdrawal of material from a storage bin or other source of supply. An important advantage resulting from the skeleton or open structure of the conveyer member resides in its ability to convey the material through the trough in a continuous uniform stream and the above described agitating device serves to guide the material into the trough and to prevent the material from arching over the mouth thereof to the end that a uniform level of material is maintained in the trough at all times.

While the preferred embodiment of the invention has been herein illustrated and described, it will be understood that the invention may be embodied in other forms within the scope of the following claims.

Having thus described the inventionn, what is claimed is:

1. Conveying apparatus comprising a circular trough having a discharge outlet, an open flight conveying element disposed in the trough, means for moving the conveying element at a relatively rapid rate through the trough, a reservoir above the trough from which material may fall into the trough through the mouth thereof, and relatively slowly rotating means separate from and capable of independent rotation with respect to said conveying element disposed adjacent the mouth of said trough for preventing material in the reservoir from arching over the mouth of the trough.

2. Conveying apparatus comprising a circular trough having an discharge outlet, an open flight conveying element disposed in and traversable through the trough, a reservoir above the trough from which material may fall into the trough, a rotatable conical member within the reservoir having the periphery of its base adjacent the trough, and means for rotating said conical member at a relatively slower rate than the traversal of said conveying element through said trough, said rotatable conical member being adapted to deflect the material in the reservoir into the trough and to prevent the material from arching over the mouth of the trough.

3. Conveying apparatus comprising a circular trough having a discharge outlet, an open flight conveying element disposed in and traversable through the trough, a reservoir above the trough having a cylindrical outer wall and from which material may fall into the trough, a conical member within the reservoir, and means for relatively rotating said conical member with relation to the cylindrical wall of said reservoir at a relatively slower rate than the traversal of said conveying element through said trough, whereby to prevent the material from arching over the mouth of the trough.

4. Conveying apparatus comprising a circular trough having a discharge outlet, an open flight conveying element disposed in and traversable through the trough, a reservoir above the trough from which material may fall into the trough, a rotatable conical member occupying a substantial portion of the space within the reservoir said conical member being separate from and mounted for rotation with respect to said conveying element, and means for rotating said conical member, said rotatable conical member being adapted to prevent the material from arching over the mouth of the trough and being provided with vanes for assisting in deflecting the material in the reservoir into the trough.

5. Conveying apparatus comprising a circular trough having a discharge outlet, an open flight conveying element disposed in and traversable through the trough, a reservoir above the trough from which material may fall into the trough, a rotatable conical member occupying a substantial portion of the space within the reservoir for deflecting material into the trough and for preventing material from arching over the mouth of the trough, said conical member being separate from and mounted for rotation with respect to said conveying element, and a plate disposed within the reservoir above the trough at the point of said discharge outlet for preventing direct passage of material from said reservoir into said discharge outlet.

6. Conveying apparatus comprising a trough having a mouth for the entrance of material therein and a discharge outlet, an endless open flight conveying element disposed in and traversable through the trough, a reservoir above the trough, a deflecting and agitating member within the reservoir, means for moving the conveying element through the trough at a relatively rapid rate, and means for relatively moving the deflecting member with relation to the wall of the reservoir at a relatively slower rate whereby to prevent the material from arching over the mouth of the trough.

7. Conveying apparatus comprising a circular trough having a discharge outlet, an open flight conveying element disposed in and traversable through the trough, a reservoir above the trough from which material may fall into the trough, and a rotatable conical member separate from and mounted for rotation with respect to said conveying element occupying a substantial portion of the space within the reservoir and being arranged to deflect material in the reservoir into the trough and prevent the material from arching over the mouth of the trough.

8. Conveying apparatus comprising a cylindrical trough defined by concentric, spaced, parallel upright walls providing an open mouth at the upper end of said trough to receive the material to be conveyed and having a bottom wall extending between the lower ends of said concentric walls provided with a gravity discharge outlet, a conveying element including a plurality of spaced flights disposed in the trough, said flights having a radial length substantially equal to the radial width of said trough, means for moving the conveying element through the trough, a cylindrical reservoir above the trough vertically aligned with the outer-most wall of said trough and from which material may fall by gravity into the trough through the mouth thereof, and agitating means formed separately from said conveying element positioned within said reservoir and disposed adjacent the mouth of said trough, and above said conveying element, for preventing material in the reservoir from arching over the mouth of the trough.

9. Conveying apparatus comprising a cylindrical trough having side walls with an open mouth at the upper end thereof to receive the material to be conveyed and having a bottom wall provided with a gravity discharge outlet disposed between said side walls, a conveying element including a plurality of spaced flights disposed in and traversable through the trough, a reservoir above the trough from which material may fall into the trough, said flights having a radial length substantially equal to the radial width of said trough, a rotatable conical member within the reservoir having the periphery of its base at the open mouth of said trough, and means for rotating said conical member, said rotatable conical member being adapted to deflect the material in the reservoir into the trough and to prevent the material from arching over the mouth of the trough.

10. Conveying apparatus comprising an annular shaped trough having an open mouth at its upper end to receive the material to be conveyed and having a bottom provided with a gravity discharge outlet, a conveying element comprising a plurality of spaced substantially radial flights disposed in the trough, means for moving the conveying element relative to said trough, a reservoir above the trough from which material may fall into the trough through the mouth thereof, and movable generally cone-shaped means separate from said conveying element disposed within said reservoir above the trough and conveying element for deflecting material into the mouth of the trough.

11. Conveying apparatus comprising a cylindrical trough having side walls with an open mouth at the upper end thereof to receive the material to be conveyed and having a bottom wall provided with a gravity discharge outlet disposed between said side walls, a conveying element including a plurality of spaced flights disposed in said trough, means for moving the conveying element through said trough, a reservoir above said trough from which material may fall by gravity into said trough through the open mouth thereof, means within said reservoir arranged to deflect the material into said trough and to prevent material in the reservoir from arching over the mouth of said trough, and a hood within said reservoir directly above said trough at the point of said discharge outlet for preventing direct passage of the material by gravity from said reservoir into said discharge outlet.

12. Conveying apparatus comprising an annular shaped trough having side walls with an open mouth at the upper end thereof to receive the material to be conveyed and having a bottom wall provided with a gravity discharge outlet between said side walls, a conveying element comprising a plurality of spaced substantially radial flights disposed in said annular trough, means for moving the conveying element relative to said annular trough, a reservoir above said annular trough from which material may fall into said annular trough through the open mouth thereof, agitating means within said reservoir including a portion disposed adjacent the open mouth of said annular trough for preventing material in the reservoir from arching over the mouth of said annular trough, and plate means within said reservoir directly above said annular trough at the point of said discharge outlet for preventing direct passage of the material by gravity from said reservoir into said discharge outlet.

13. Conveying apparatus comprising a cylindrical trough having side walls with an open mouth at the upper end thereof to receive the material to be conveyed and having a bottom wall provided with a gravity discharge outlet between said side walls, a conveying element including a plurality of spaced flights disposed in and traversable through said trough, a reservoir above said trough from which material may fall by gravity into said trough, a rotatable conical member within said reservoir having the periphery of its base adjacent the open mouth of said trough, means for moving said conveying element and rotating said conical member, said rotatable conical member being adapted to deflect the material in said reservoir into said trough and to prevent the material from arching over the mouth of said trough, and a hood within said reservoir directly above said trough at the point of said discharge outlet for preventing direct passage of the material from said reservoir into said discharge outlet.

ALFRED DELOS SINDEN.